US011003320B2

(12) United States Patent
Chakerian et al.

(10) Patent No.: US 11,003,320 B2
(45) Date of Patent: *May 11, 2021

(54) SYSTEMS AND METHODS FOR ORGANIZING AND IDENTIFYING DOCUMENTS VIA HIERARCHIES AND DIMENSIONS OF TAGS

(71) Applicant: Palantir Technologies Inc., Palo Alto, CA (US)

(72) Inventors: John Chakerian, Los Altos Hills, CA (US); Carl Freeland, Mountain View, CA (US); Jack Grossman, Albuquerque, NM (US); Lawrence Manning, New York, NY (US); Adam Torres, Palo Alto, CA (US); Michael Yang, New York, NY (US)

(73) Assignee: Palantir Technologies Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/570,410

(22) Filed: Sep. 13, 2019

(65) Prior Publication Data
US 2020/0004395 A1 Jan. 2, 2020

Related U.S. Application Data

(63) Continuation of application No. 15/636,234, filed on Jun. 28, 2017, now Pat. No. 10,474,326, which is a (Continued)

(51) Int. Cl.
*G06F 16/30* (2019.01)
*G06F 3/0482* (2013.01)
(Continued)

(52) U.S. Cl.
CPC .......... *G06F 3/0482* (2013.01); *G06F 16/252* (2019.01); *G06F 16/282* (2019.01);
(Continued)

(58) Field of Classification Search
CPC ..... G06F 16/904; G06F 16/955; G06F 16/282
(Continued)

(56) References Cited

U.S. PATENT DOCUMENTS 9,727,560 B2 8/2017 Chakerian et al.
10,474,326 B2 11/2019 Chakerian et al.
(Continued)

FOREIGN PATENT DOCUMENTS

EP 3540582 9/2019

*Primary Examiner* — Sana A Al-Hashemi
(74) *Attorney, Agent, or Firm* — Knobbe Martens Olson & Bear LLP

(57) ABSTRACT

Computer-implemented systems and methods are disclosed to interface with one or more storage devices storing a plurality of documents, wherein each of the plurality of documents is associated with one or more tags of one or more predefined hierarchies of tags, wherein the one or more hierarchies of tags include multiple dimensions. In accordance with some embodiments, a method is provided to identify one or more documents from the data storage devices. The method comprises acquiring, via an interface, a selection of one or more tags of the one or more predefined hierarchies of tags. The method further comprises identifying one or more documents from the data storage devices in response to the selection, the identified one or more documents having tags that have a relationship with the selected tags, and providing data corresponding to the identified documents for displaying in the interface.

20 Claims, 15 Drawing Sheets

Related U.S. Application Data continuation of application No. 14/631,633, filed on Feb. 25, 2015, now Pat. No. 9,727,560.

(51) Int. Cl.
| | |
|---|---|
| *G06F 16/81* | (2019.01) |
| *G06F 16/84* | (2019.01) |
| *G06F 16/93* | (2019.01) |
| *G06F 16/25* | (2019.01) |
| *G06F 16/28* | (2019.01) |
| *G06F 16/955* | (2019.01) |

(52) U.S. Cl.
CPC ............ *G06F 16/289* (2019.01); *G06F 16/81* (2019.01); *G06F 16/84* (2019.01); *G06F 16/86* (2019.01); *G06F 16/93* (2019.01); *G06F 16/955* (2019.01)

(58) Field of Classification Search
USPC ........ 707/609, 687, 705, 769, 790, 813, 821
See application file for complete search history.

(56) References Cited

U.S. PATENT DOCUMENTS

| | | | | |
|---|---|---|---|---|
| 2011/0213655 A1* | 9/2011 | Henkin | .............. | G06Q 30/0251 705/14.49 |
| 2012/0110515 A1* | 5/2012 | Abramoff | ............. | G06F 16/904 715/854 |

* cited by examiner

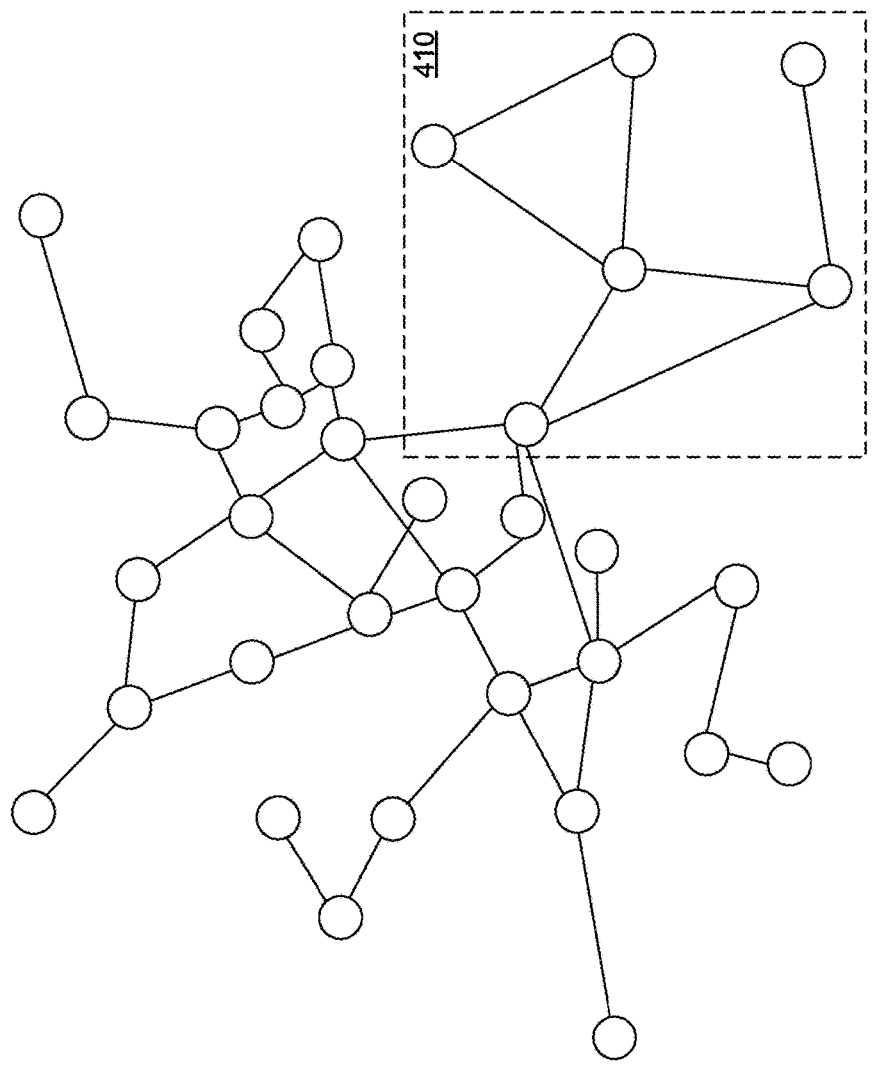

FIG. 8A

SYSTEMS AND METHODS FOR ORGANIZING AND IDENTIFYING DOCUMENTS VIA HIERARCHIES AND DIMENSIONS OF TAGS

CROSS-REFERENCE TO RELATED APPLICATIONS

This application is a continuation of U.S. patent application Ser. No. 15/636,234, filed Jun. 28, 2017, and titled "SYSTEMS AND METHODS FOR ORGANIZING AND IDENTIFYING DOCUMENTS VIA HIERARCHIES AND DIMENSIONS OF TAGS," which is a continuation of U.S. patent application Ser. No. 14/631,633, filed Feb. 25, 2015, and titled "SYSTEMS AND METHODS FOR ORGANIZING AND IDENTIFYING DOCUMENTS VIA HIERARCHIES AND DIMENSIONS OF TAGS." The entire disclosure of each of the above item is hereby made part of this specification as if set forth fully herein and incorporated by reference for all purposes, for all that it contains.

Any and all applications for which a foreign or domestic priority claim is identified in the Application Data Sheet as filed with the present application are hereby incorporated by reference under 37 CFR 1.57.

BACKGROUND

Data is commonly stored in computer-based systems in fixed, rigidly structured data stores. For example, one common type of data store is a "flat" file such as a spreadsheet, plain-text document, or XML document. Another common type of data store is a relational database comprising one or more tables. Other examples of data stores that comprise structured data include, without limitation, files systems, object collections, record collections, arrays, hierarchical trees, linked lists, stacks, and combinations thereof.

Often, the underlying structure of these types of data stores is poorly suited for data analysis. One approach for facilitating a more efficient analysis of data in such data stores is to reorganize that data according to an object model that defines object structures and relationships between the object structures. Tagging is a method used to create objects, properties, or links between objects and/or properties in structured or unstructured data. It can add structure to unstructured data or add further structure to structured data. An exemplary system and method for tagging is described in detail in U.S. application Ser. No. 14/025,653, filed on Sep. 12, 2013, and titled "Systems and Methods for Providing a Tagging Interface for External Content," which is incorporated herein by reference in its entirety.

BRIEF DESCRIPTION OF THE DRAWINGS

Reference will now be made to the accompanying drawings showing example embodiments of the present application, and in which:

FIGS. 4A-4B are charts illustrating an exemplary object model reflecting relationships between tags, consistent with embodiments of the present disclosure.

FIGS. 8A-8B are screenshots depicting an exemplary interface for identifying and displaying documents based on tags from previously identified documents, consistent with embodiments of the present disclosure.

DETAILED DESCRIPTION OF EXEMPLARY EMBODIMENTS

Figure 1:
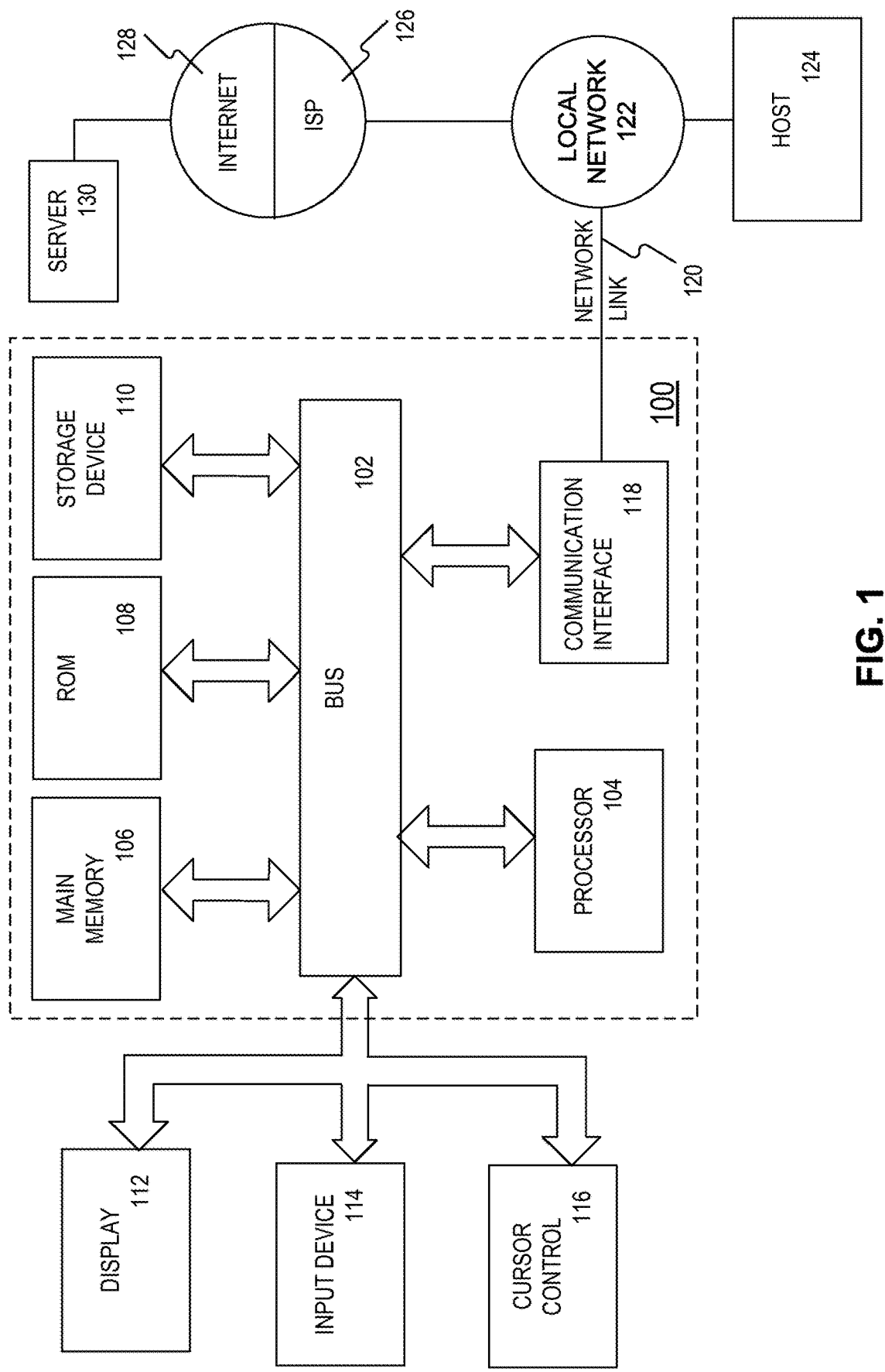
FIG. 1 is a block diagram of an exemplary computer system with which embodiments described herein can be implemented, consistent with embodiments of the present disclosure.

Reference will now be made in detail to the embodiments, the examples of which are illustrated in the accompanying drawings. Whenever possible, the same reference numbers will be used throughout the drawings to refer to the same or like parts.

Embodiments of the present disclosure provide a means to organize and access data structured with tag objects (e.g. by associating a portion or part or entirety of the data with tags) by providing a pre-defined hierarchy of tags. As an exemplary illustration, the hierarchy can include one or more dimensions, each dimension comprising a set of tags corresponding to that dimension. The pre-defined hierarchy of tags facilitates tag-based identification and retrieval of the data associated with one or more selected tags that are part of the hierarchy, which can allow a user of the system to navigate through a very large data sets to identify appropriate data or documents associated with or related to the one or more selected tags.

Embodiments of the present disclosure further provide an interface allowing the user to navigate through very large data sets to identify and display appropriate data or documents associated with or related to the one or more selected tags. Via the interface, a user can input a selection of tags and retrieve a document associated with the tags selection, as well as other documents that are related to the tags selection. The interface also updates the tags selection based on a document retrieved by the user, allowing the user to identify other related documents. The interface further facilitates a user's navigation through a very large data sets to identify appropriate data or documents associated with or related to the one or more selected tags.

The tag objects can include one or more attributes, and a relationship can be defined between the attributes of each tag object (or combinations thereof). As an exemplary illustration, the tag object can include attributes including a tag label, a tag type, and one or more properties. Moreover, based on these attributes, one or more relationships between tags can be defined.

After the one or more tags are selected in the interface, data associated with those tags can be acquired. Moreover, one or more other tags related to the selected tags can be identified, which can allow data associated with the one or more other tags to also be acquired. This further facilitates tag-based identification and retrieval of the data associated with tags that are part of the hierarchy by, for example, allowing the user to navigate within a huge universe of data structured with tags, guided by the pre-defined hierarchy of tags, as well as the pre-defined relationship between the tags in the hierarchy.

According to some embodiments, the operations, techniques, and/or components described herein can be implemented by an electronic device, which can include one or more special-purpose computing devices. The special-purpose computing devices can be hard-wired to perform the operations, techniques, and/or components described herein, or can include digital electronic devices such as one or more application-specific integrated circuits (ASICs) or field programmable gate arrays (FPGAs) that are persistently programmed to perform the operations, techniques and/or components described herein, or can include one or more hardware processors programmed to perform such features of the present disclosure pursuant to program instructions in firmware, memory, other storage, or a combination. Such special-purpose computing devices can also combine custom hard-wired logic, ASICs, or FPGAs with custom programming to accomplish the technique and other features of the present disclosure. The special-purpose computing devices can be desktop computer systems, portable computer systems, handheld devices, networking devices, or any other device that incorporates hard-wired and/or program logic to implement the techniques and other features of the present disclosure.

The one or more special-purpose computing devices can be generally controlled and coordinated by operating system software, such as iOS, Android, Blackberry, Chrome OS, Windows XP, Windows Vista, Windows 7, Windows 8, Windows Server, Windows CE, Unix, Linux, SunOS, Solaris, VxWorks, or other compatible operating systems. In other embodiments, the computing device can be controlled by a proprietary operating system. Operating systems control and schedule computer processes for execution, perform memory management, provide file system, networking, I/O services, and provide a user interface functionality, such as a graphical user interface ("GUI"), among other things.

FIG. 1 is a block diagram of an exemplary computer system 100 with which embodiments described herein can be implemented, consistent with embodiments of the present disclosure. Computer system 100 includes a bus 102 or other communication mechanism for communicating information, and one or more hardware processors 104 (denoted as processor 104 for purposes of simplicity) coupled with bus 102 for processing information. Hardware processor 104 can be, for example, one or microprocessors.

Computer system 100 also includes a main memory 106, such as a random access memory (RAM) or other dynamic storage device, coupled to bus 102 for storing information and instructions to be executed by processor 104. Main memory 106 also can be used for storing temporary variables or other intermediate information during execution of instructions to be executed by processor 104. Such instructions, after being stored in non-transitory storage media accessible to processor 104, render computer system 100 into a special-purpose machine that is customized to perform the operations specified in the instructions.

Computer system 100 further includes a read only memory (ROM) 108 or other static storage device coupled to bus 102 for storing static information and instructions for processor 104. A storage device 110, such as a magnetic disk, optical disk, or USB thumb drive (Flash drive), etc., is provided and coupled to bus 102 for storing information and instructions.

Computer system 100 can be coupled via bus 102 to a display 112, such as a cathode ray tube (CRT), an liquid crystal display (LCD), or a touch screen, for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. The input device typically has two degrees of freedom in two axes, a first axis (for example, x) and a second axis (for example, y), that allows the device to specify positions in a plane. In some embodiments, the same direction information and command selections as cursor control may be implemented via receiving touches on a touch screen without a cursor.

Computing system 100 can include a user interface module to implement a graphical user interface (GUI) that can be stored in a mass storage device as executable software codes that are executed by the one or more computing devices. This and other modules can include, by way of example, components, such as software components, object-oriented software components, class components and task components, processes, functions, fields, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module can be compiled and linked into an executable program, installed in a dynamic link library, or written in an interpreted programming language such as, for example, BASIC, Perl, or Python. It will be appreciated that software modules can be callable from other modules or from themselves, and/or can be invoked in response to detected events or interrupts. Software modules configured for execution on computing devices can be provided on a computer readable medium, such as a compact disc, digital video disc, flash drive, magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in firmware, such as an EPROM. It will be further appreciated that hardware modules can be comprised of connected logic units, such as gates and flip-flops, and/or can be comprised of programmable units, such as programmable gate arrays or processors. The modules or computing device functionality described herein are preferably implemented as software modules, but can be represented in hardware or firmware. Generally, the modules described herein refer to logical modules that can be combined with other modules or divided into sub-modules despite their physical organization or storage.

Computer system 100 can implement the techniques described herein using customized hard-wired logic, one or more ASICs or FPGAs, firmware and/or program logic which in combination with the computer system causes or programs computer system 100 to be a special-purpose machine. According to some embodiments, the operations, functionalities, and techniques and other features described herein are performed by computer system 100 in response to processor 104 executing one or more sequences of one or more instructions contained in main memory 106. Such instructions can be read into main memory 106 from another storage medium, such as storage device 110. Execution of the sequences of instructions contained in main memory 106 causes processor 104 to perform the process steps described herein. In alternative embodiments, hard-wired circuitry can be used in place of or in combination with software instructions.

The term "non-transitory media" as used herein refers to any non-transitory media storing data and/or instructions that cause a machine to operate in a specific fashion. Such non-transitory media can comprise non-volatile media and/or volatile media. Non-volatile media can include, for example, optical or magnetic disks, such as storage device 110. Volatile media can include dynamic memory, such as main memory 106. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from, but can be used in conjunction with, transmission media. Transmission media can participate in transferring information between storage media. For example, transmission media can include coaxial cables, copper wire and fiber optics, including the wires that comprise bus 102. Transmission media can also take the form of acoustic or light waves, such as those generated during radio-wave and infra-red data communications.

Various forms of media can be involved in carrying one or more sequences of one or more instructions to processor 104 for execution. For example, the instructions can initially be carried on a magnetic disk or solid state drive of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 can optionally be stored on storage device 110 either before or after execution by processor 104.

Computer system 100 can also include a communication interface 118 coupled to bus 102. Communication interface 118 can provide a two-way data communication coupling to a network link 120 that can be connected to a local network 122. For example, communication interface 118 can be an integrated services digital network (ISDN) card, cable modem, satellite modem, or a modem to provide a data communication connection to a corresponding type of telephone line. As another example, communication interface 118 can be a local area network (LAN) card to provide a data communication connection to a compatible LAN. Wireless links can also be implemented. In any such implementation, communication interface 118 can send and receive electrical, electromagnetic or optical signals that carry digital data streams representing various types of information.

Network link 120 can typically provide data communication through one or more networks to other data devices. For example, network link 120 can provide a connection through local network 122 to a host computer 124 or to data equipment operated by an Internet Service Provider (ISP) 126. ISP 126 in turn can provide data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, can be example forms of transmission media.

Computer system 100 can send messages and receive data, including program code, through the network(s), network link 120 and communication interface 118. In the Internet example, a server 130 can transmit a requested code for an application program through Internet 128, ISP 126, local network 122 and communication interface 118.

The received code can be executed by processor 104 as it is received, and/or stored in storage device 110, or other non-volatile storage for later execution. In some embodiments, server 130 can provide information for being displayed on a display.

Figure 2:
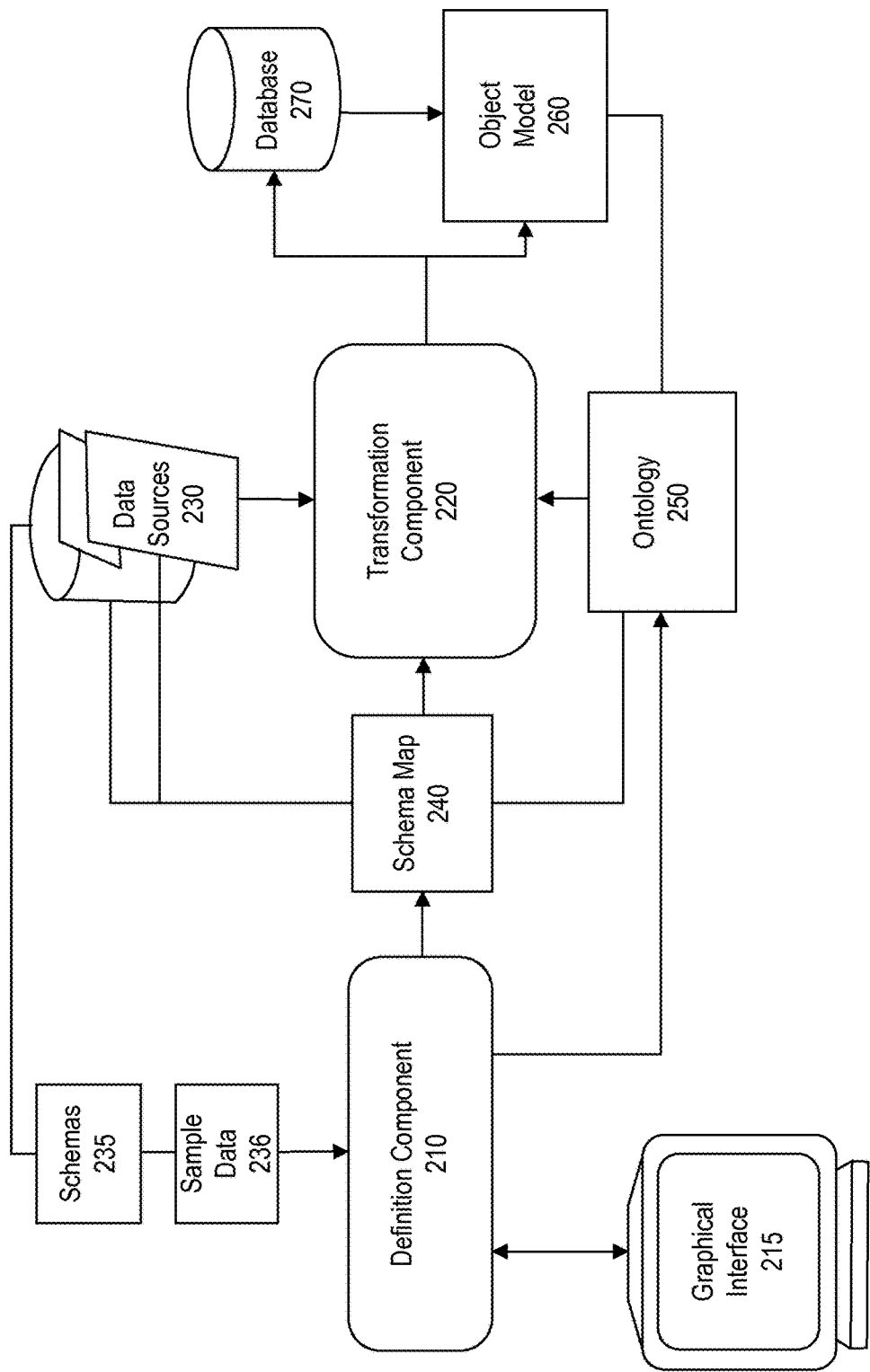
FIG. 2 is a block diagram depicting an exemplary internal database system, consistent with embodiments of the present disclosure.

FIG. 2 is a block diagram depicting an exemplary internal database system 200, consistent with embodiments of the present disclosure. Among other things, system 200 facilitates transformation of one or more data sources, such as data sources 230, into an object model 260, whose semantics are defined by an ontology 250. The transformation can be performed for a variety of reasons. For example, a database administrator can wish to import data from data sources 230 into a database 270 for persistently storing object model 260. As another example, a data presentation component (not depicted) can transform input data from data sources 230 "on the fly" into object model 260. Object model 260 can then be utilized, in conjunction with ontology 250, for analysis through graphs and/or other data visualization techniques.

System 200 comprises a definition component 210 and a transformation component 220, both implemented by one or more processors on one or more computing devices executing hardware and/or software-based logic for providing various functionality described herein. As will be appreciated from the present disclosure, system 200 can comprise fewer or additional components that provide various functionalities described herein. Such components are, for clarity, omitted from FIG. 1. Moreover, the component(s) of system 200 responsible for providing various functionalities can further vary from embodiment to embodiment.

Definition component 210 generates and/or modifies ontology 250 and a schema map 240. Exemplary embodiments for defining an ontology (such as ontology 250) is described in U.S. Pat. No. 7,962,495 (the '495 patent), issued Jun. 14, 2011, the entire contents of which are expressly incorporated herein by reference for all purposes. Among other things, the '495 patent describes embodiments that define a dynamic ontology for use in creating data in a database. For creating a database ontology, one or more object types are created where each object type can include one or more properties. The attributes of object types or property types of the ontology can be edited or modified at any time.

In some embodiments, each property type is declared to be representative of one or more object types. A property type is representative of an object type when the property type is intuitively associated with the object type. For example, a property type of "geographical location" may be representative of an object type "locale" but not representative of an object type "style."

Schema map 240 can define how various elements of schemas 235 for data sources 230 map to various elements of ontology 250. Definition component 210 receives, calculates, extracts, or otherwise identifies schemas 235 for data sources 230. Schemas 235 define the structure of data sources 230—for example, the names and other characteristics of tables, files, columns, fields, properties, and so forth. Definition component 210 furthermore optionally identifies sample data 236 from data sources 230. Definition component 210 can further identify object type, relationship, and property definitions from ontology 250, if any already exist. Definition component 210 can further identify preexisting mappings from schema map 240, if such mappings exist.

Transformation component 220 can be invoked after schema map 140 and ontology 250 have been defined or redefined. Transformation component 220 identifies schema map 240 and ontology 250. Transformation component 120 further reads data sources 230 and identifies schemas 235 for data sources 230. For each element of ontology 250 described in schema map 240, transformation component 220 iterates through some or all of the data items of data sources 230, generating elements of object model 260 in the manner specified by schema map 240. In some embodiments, transformation component 220 can store a representation of each generated element of object model 260 in a database 270. In some embodiments, transformation component 220 is further configured to synchronize changes in object model 160 back to data sources 230.

Data sources 230 can be one or more sources of data, including, without limitation, spreadsheet files, databases, email folders, document collections, media collections, contact directories, and so forth. Data sources 230 can include structured data (e.g., a database, a .csv file, or any tab delimited or fixed-width file), semi-structured data (e.g., an email, an email server, or forms such as a suspicious activity report or currency transaction report), or unstructured data (e.g., encoded files such as PDF, sound, and image files). Data sources 230 can include data structures stored persistently in non-volatile memory. Data sources 230 can also or instead include temporary data structures generated from underlying data sources via data extraction components, such as a result set returned from a database server executing an database query.

Schema map 240, ontology 250, and schemas 235 can be stored in any suitable data structures, such as XML files, database tables, and so forth. In some embodiments, ontology 250 is maintained persistently. Schema map 240 can or cannot be maintained persistently, depending on whether the transformation process is perpetual or a one-time event. Schemas 235 need not be maintained in persistent memory, but can be cached for optimization.

Object model 260 comprises collections of elements such as typed objects, properties, and relationships. The collections can be structured in any suitable manner. In some embodiments, a database 270 stores the elements of object model 260, or representations thereof. In some embodiments, the elements of object model 260 are stored within database 270 in a different underlying format, such as in a series of object, property, and relationship tables in a relational database Based on the identified information, definition component 210 can generate a graphical interface 215. Graphical interface 215 can be presented to users of a computing device via any suitable output mechanism (e.g., a display screen, an image projection, etc.), and can further accept input from users of the computing device via any suitable input mechanism (e.g., a keyboard, a mouse, a touch screen interface). Graphical interface 215 may feature a visual workspace that visually depicts representations of the elements of ontology 250 for which mappings are defined in schema map 240. Graphical interface 215 can further utilize the sample data 236 to provide the user with a preview of object model 260 as the user defines schema map 240. In response to the input via the various controls of graphical interface 215, definition component 210 can generate and/or modify ontology 250 and schema map 240, and/or identify object models and sample data schemas 235 and data sources 230.

In some embodiments, graphical interface 215 also provides a user with the ability to add structure to an unstructured document stored in data sources 230 by tagging one or more portions (e.g., text) within the document. Defining tags and applying these tags to a portion of the document can create tag objects, properties, or links creating a relationship between one or more tag objects and/or properties. In some embodiments, graphical interface 215 allows a user to input one or more pre-defined tags to retrieve a tagged document, and/or a set of related documents that are associated with other pre-defined tags which are different from, but have a relationship to, the one or more input pre-defined tags. In some embodiments, graphical interface 215 also displays to the user the tags associated with those related documents, and the user can use those tags to identify another tagged documents, and/or another set of related documents, thereby allowing the user to "move" between the documents stored in data sources 230 guided by the relationships between the pre-defined tags.

Figure 3:
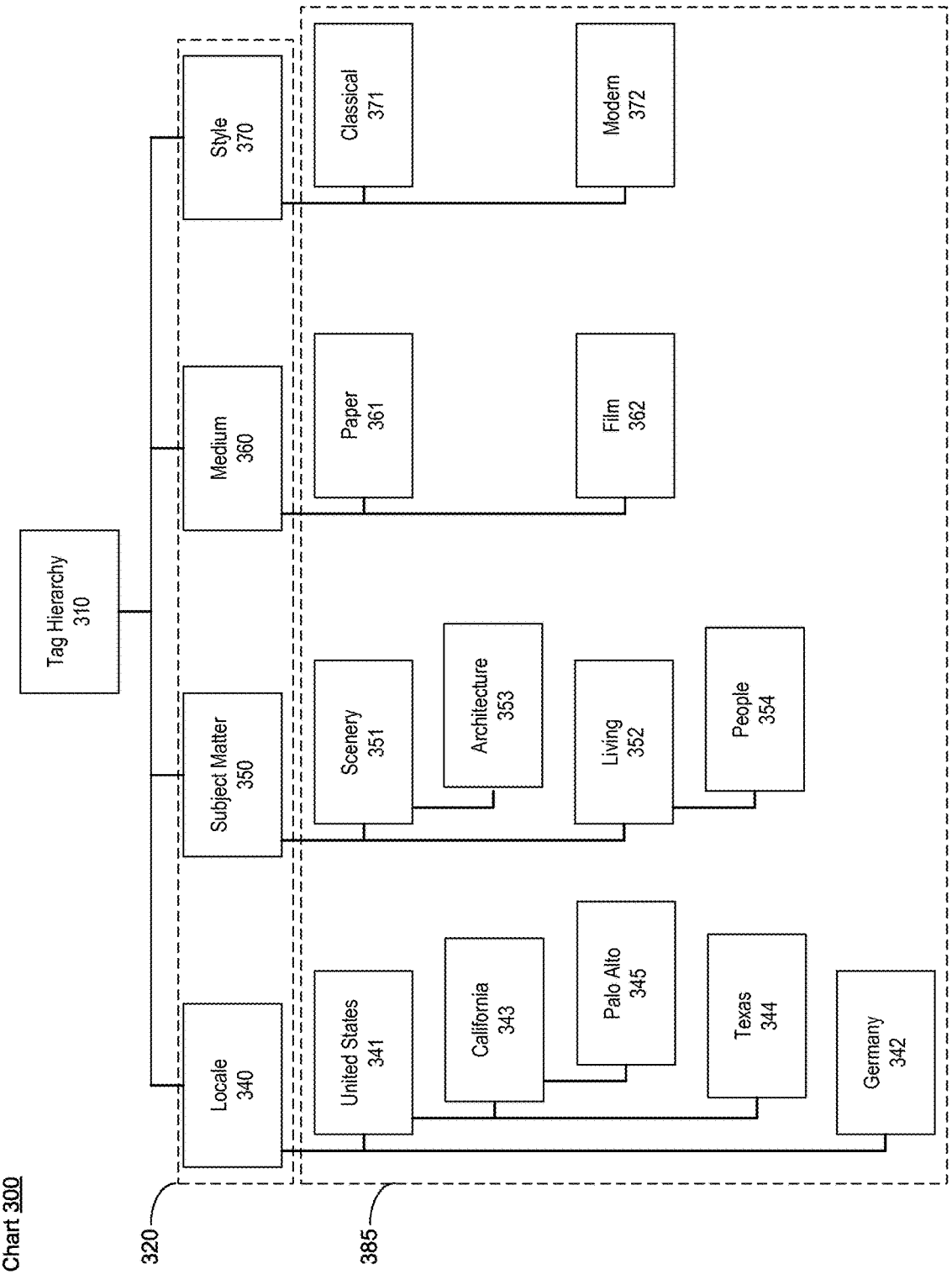
FIG. 3 is a chart illustrating an exemplary hierarchical structure of tags, consistent with embodiments of the present disclosure.

FIG. 3 is a chart 300 illustrating an exemplary hierarchical structure of tags 310 ("tag hierarchy"), consistent with embodiments of the present disclosure. In some embodiments, the exemplary tag hierarchy in FIG. 3 can provide part of the structure of object model 260 stored within database 270 in FIG. 2. Tag hierarchy 310 can include dimensions 320. For example, as shown in tag hierarchy 310, these dimensions include a locale dimension 340, a subject matter dimension 350, a medium dimension 360, and a style dimension 370. Each dimension includes a set of tags, which includes one or more tags linked to that dimension. In some embodiments, tags are created as objects with attributes, and these links can be established based on the attributes of the tags. The tags constitute a group of tags 330.

As shown in FIG. 3, locale dimension 340 can include a set of tags having attributes related to regions and countries. As an exemplary illustration, under the locale dimension 340, there is a United States tag 341 and a Germany tag 342. There can also be a further subset of tags (e.g., California tag 343 and Texas tag 344) under United States tag 341, where California tag 343 and Texas tag 344 have attributes indicating that they are associated with United States (e.g. being a state of the United States), which can allow California tag 343 and Texas tag 344 to be linked to United States tag 341. Similarly, California tag 343 can also have a further subset of tags (e.g. Palo Alto tag 345).

The relationship between a tag and any corresponding subset of tags can be based on attributes in that tag and in the corresponding subset of tags. For example, Palo Alto tag 345 has attributes indicating that it is associated with California (e.g., a city of the state of California), which can allow Palo Alto tag 345 to be linked to California tag 343.

Under tag hierarchy 310, subject matter dimension 350 can include tags with attributes related to a classification based on content. As an exemplary illustration, under subject matter dimension 350, there are scenery tag 351 and living tag 352, where scenery tag 351 has attributes indicating that the content is related to scenery (e.g. depicting or describing a scene), while living tag 352 has attributes indicating that the content is related to a living thing (e.g. depicting or describing a living organism, such as human). Scenery tag 351 can have a further subset of tags (e.g. architecture tag 353), where architecture tag 353 has attributes indicating that the content is related to architecture (e.g. depicting or describing buildings), which can allow architecture tag 353 to be linked with scenery tag 351. Similarly, living tag 352 can have a further subset of tags (e.g. people tag 354), where people tag 354 has attributes indicating that the content is related to a human (e.g. a portrait), which can allow tag 354 to be linked with living tag 352.

Under tag hierarchy 310, medium dimension 360 can include tags with attributes related to a classification based on a medium on which the content is rendered. As an exemplary illustration, there are paper tag 361 and film tag 362 under medium dimension 360. Furthermore, style dimension 370 can also include tags with attributes related to a classification based on a style of rendering the content. As an exemplary illustration, there are classical tag 371 and modern tag 372 under the style dimension 370. A person with ordinary skill in the art will understand that the dimensions and tags depicted in FIG. 3 are for illustration purposes only, and there is no limitation on the number of dimensions, how dimensions are defined, and how the tags are organized under each dimension.

FIG. 4A shows, in a chart 400, an exemplary object model reflecting relationships between tags, consistent with embodiments of the present disclosure. In chart 400, each circle represents a cell, and each line represents a relationship between cells. In some embodiments, a cell within the object model can be associated with one or more pre-defined tags, and the relationship between the cells can be defined based on a relationship between the attributes of the tags associated with the cells. Each of the cells can also be associated with the tagged documents stored in data sources 230 of FIG. 2 via, for example, common tags or related tags associated with both the cells and the tagged documents. A document can also be associated with one or more of the cells, if the document is tagged with multiple sets of tags that are associated with multiple cells.

Figure 4B:
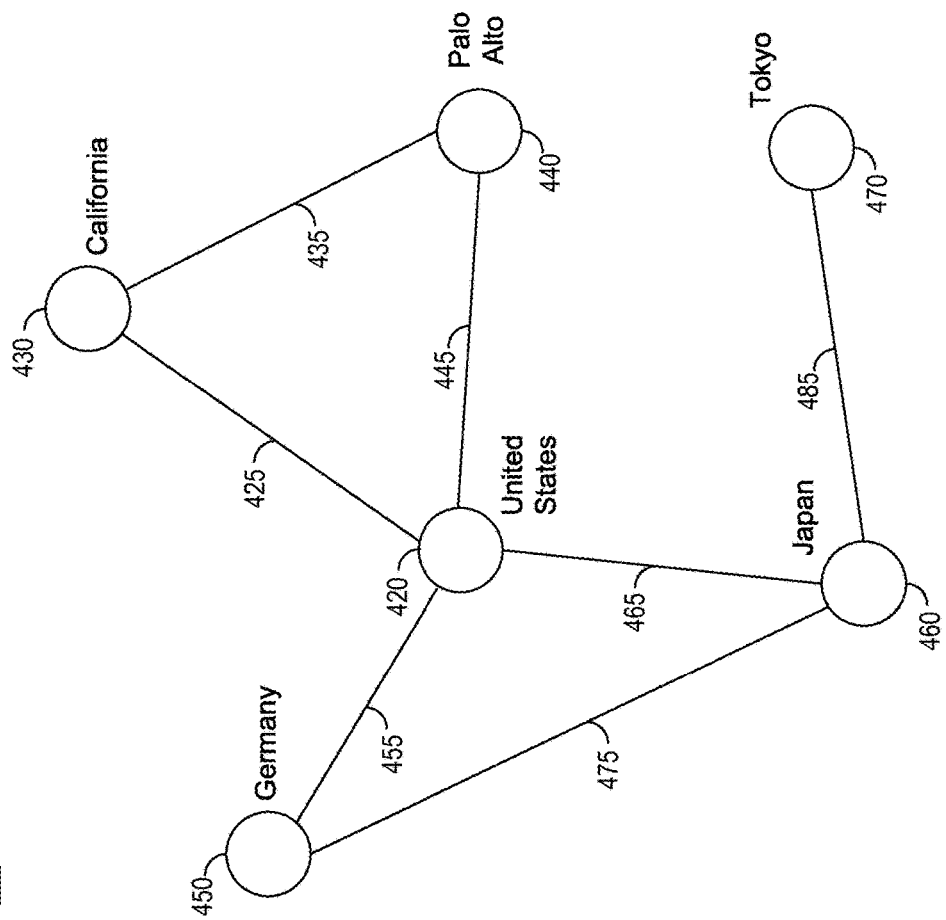

Chart 400 also includes a sub-chart 410 which includes an exemplary subset of cells and relationships of the object model. FIG. 4B shows a close-up view of sub-chart 410. Sub-chart 410 illustrates cells 420, 430, 440, 450, 460, and 470, as well as relationships 425, 435, 445, 455, 465, 475, and 485. As an exemplary illustration, cell 420 can be associated with United States tag 341, cell 430 can be associated with California tag 343, cell 440 can be associated with Palo Alto tag 345, cell 450 can be associated with Germany tag 342, cell 460 can be associated with a Japan tag (not shown in tag hierarchy 310 of FIG. 3), and cell 470 can be associated with a Tokyo tag (not shown in tag hierarchy 310 of FIG. 3). Among these cells, cell 420 (with the United States tag), cell 450 (with the Germany tag), and cell 460 (with the Japan tag) can have relationship 455, 465, and 475 between each other by virtue of, for example, that the United States tag, the Germany tag, and the Japan tag all have attributes related to an indication of a country with a developed economy.

Cell 430 (with the California tag) has relationship 425 with cell 420 (with the United States tag) by virtue of, for example, that the California tag has attributes that link it to United States tag 341 (e.g. California being a state of United States), the link to which can allow the California tag to be related to the United States tag. Furthermore, cell 440 (with the Palo Alto tag) can also have relationship 435 with cell 430 by virtue of, for example, that the Palo Alto tag includes attributes that link it to California tag 343 (e.g. Palo Alto being a city of California), the link to which can allow the Palo Alto tag to be related to the California tag. Palo Alto tag 345 can also include attributes that link it to United States tag 341 (e.g. Palo Alto being a city of United States), the link to which can allow cell 440 to also have the relationship 445 with cell 420.

On the other hand, cell 460 (with the Japan tag) can have a relationship 485 with cell 470 (with the Tokyo tag) by virtue of, for example, that the Tokyo tag has attributes that link it to the Japan tag (e.g. Tokyo being a city of Japan), the link to which can allow the Tokyo tag to be related to the Japan tag. But in this exemplary illustration, the Tokyo tag may have no relationship with the Germany tag, the United States tag, the California tag, or the Palo Alto tag, therefore cell 470 may have no relationship with cells 420, 430, 440, or 450 within sub-chart 410.

Figure 5:
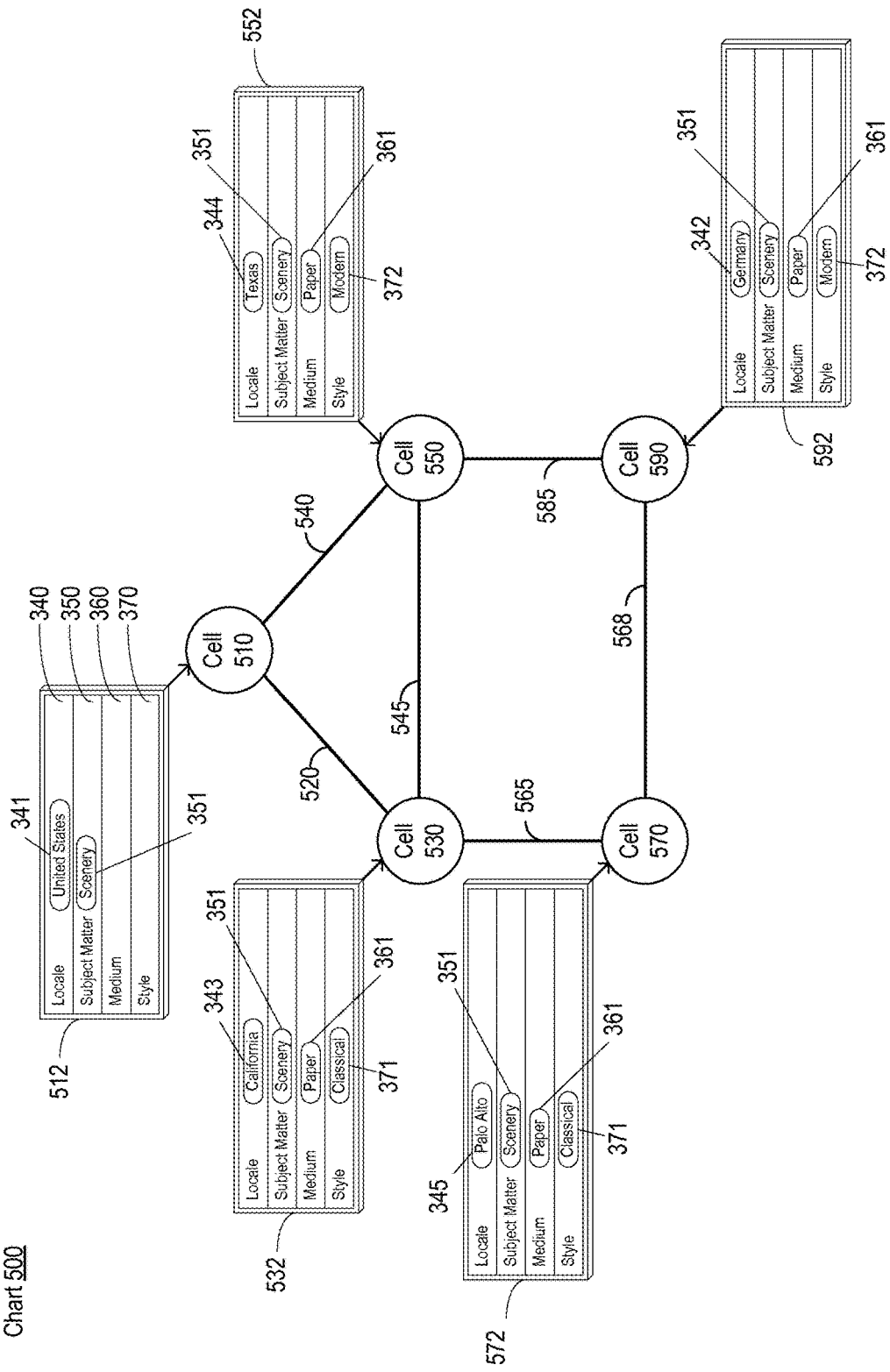
FIG. 5 is a chart illustrating an exemplary object model reflecting relationships between combinations of tags of the exemplary hierarchical structure of tags depicted in FIG. 3, consistent with embodiments of the present disclosure.

FIG. 5 is a chart 500 illustrating an exemplary object model reflecting relationships between combinations of tags of the exemplary hierarchical structure of tags depicted in FIG. 3, consistent with embodiments of the present disclosure. In some embodiments, the object model shown in chart 500 includes cells 510, 530, 550, 570, and 590, each of which can be, respectively, associated with tag combinations 512, 532, 552, 572, and 592. Each tag combination includes one or more tags for each of its dimensions, which include, for example, locale dimension 340, subject matter dimension 350, medium dimension 360, and style dimension 370 as depicted in FIG. 3. The tag combination can include tags of tag hierarchy 310 as depicted in FIG. 3, and can include one or more tags for each dimension as depicted in FIG. 3. Each of these cells can also be associated with the tagged documents stored in data sources 230 of FIG. 2 via the tags. The object model shown in chart 500 also includes relationships 520, 540, 545, 565, 568, and 585 between the cells. As to be illustrated below, these relationships can be determined based on the relationship between tags within one or more dimensions.

As an exemplary illustration, cell 510 is associated with tag combination 512, which includes United States tag 341 under the locale dimension and scenery tag 351 under the subject matter dimension. Cell 530 is associated with tag combination 532, which includes California tag 343 under the locale dimension, scenery tag 351 under the subject matter dimension, paper tag 361 under the medium dimension, and classical tag 371 under the style dimension. Cell 570 is associated with tag combination 572. Tag combination 572 is otherwise identical to tag combination 532 except that tag combination 572 has Palo Alto tag 345 instead of California tag 343 under the locale dimension. Moreover, cell 550 is associated with tag combination 552, which includes Texas tag 344 under the locale dimension, scenery tag 351 under the subject matter dimension, paper tag 361 under the medium dimension, and modern tag 372 under the style dimension. Lastly, cell 590 is associated with tag combination 592. Tag combination 592 is otherwise identical to tag combination 552, except that tag combination 592 has Germany tag 342 instead of Texas tag 344 under the locale dimension.

Relationship 520 between cell 510 and cell 530 can be determined based on, for example, a relationship between the United States tag (associated with cell 510) and the California tag (associated with cell 530) under the locale dimension. A relationship 540 between cell 510 and cell 550 can also be determined based on, for example, a relationship between the Texas tag (associated with cell 550) and the United States tag under the locale dimension. Furthermore, relationship 545 between cell 530 and cell 550 can also be determined based on, for example, both the relationship between the California tag and the Texas tag under the locale dimension, as well as the relationship between the paper tag (associated with cell 530) and the film tag (associated with cell 550) under the medium dimension. In this particular example, because both cells 510 and 530 have scenery tag 351 for the subject matter dimension, the subject matter dimension can be ignored in determining relationship 520. Also, because cell 510 does not have tags for the medium and style dimensions, these dimensions can also be ignored in determining relationships 520 and 540.

As discussed before, the relationship between tags can be determined based, for example, the attributes of the tags. In addition, relationship between tags can also be established in other ways. For example, tags can become related to each other when both tags are associated with a document, with documents that have related metadata, or with a cell. Furthermore, relationship between tags can also be created manually according to any pre-defined condition.

In some embodiments, each tag combination in FIG. 5 can be represented as a multi-dimensional vector, with each dimension of tag hierarchy 310 represented by a vector dimension, and a combination of one or more tags under a dimension of tag hierarchy 310 contributes to a magnitude of the vector along that vector dimension, based on the attributes of the tags. The relationship between tags can then be calculated as, for example, an imaginary distance between the multi-dimensional vectors representing the tag combinations. In some embodiments, such imaginary distance can be calculated by first projecting the multi-dimensional vectors representing the tag combinations onto a pre-defined plane, and then calculating a distance between the projections on the pre-defined plane. In some embodiments, when the calculated distance exceeds a certain threshold, it can be determined that no relationship exists between the tag combinations. In some embodiments, the relationship between cells (or between tag combinations associated with the cells) can also be added manually with or without considering the calculated distance.

Referring back to FIG. 5, cell 570 is associated with tag combination 572, which includes Palo Alto tag 345 under the locale dimension, and the locale dimension is the only dimension with different tags when compared with tag combination 532 associated with cell 530. Relationship 565 can then be determined based on, for example, the relationship between California tag 343 and Palo Alto tag 345 under the locale dimension alone. Similarly, cell 590 is associated with tag combination 592, which includes Germany tag 342 under the locale dimension, and the locale dimension is the only dimension with different tags when compared with the tag combination 552 associated with cell 550. Relationship 585 can then be determined based on, for example, the relationship between Germany tag 342 and Texas tag 344 under the locale dimension alone.

Relationship 568 between cells 570 and 590 can also be determined based on, for example, both the relationship between the Palo Alto tag (associated with cell 570) and the Germany tag (associated with cell 590) under the locale dimension, as well as the relationship between the classical tag (associated with cell 570) and the modern tag (associated with cell 590) under the medium dimension. In some embodiments, as discussed above, each of the cells in object model 500 can be associated with documents stored in data sources 230 that are tagged with the same tags associated with each cell, and relationship 568 can be established by, for example, that a document stored in data sources 230 describes a Germany film derived from a Palo Alto novel, and therefore is tagged with tags including, for example, Germany tag 342, Palo Alto tag 345, paper tag 361, and film tag 362, etc., notwithstanding any calculated distance between these tags.

Figure 6A:
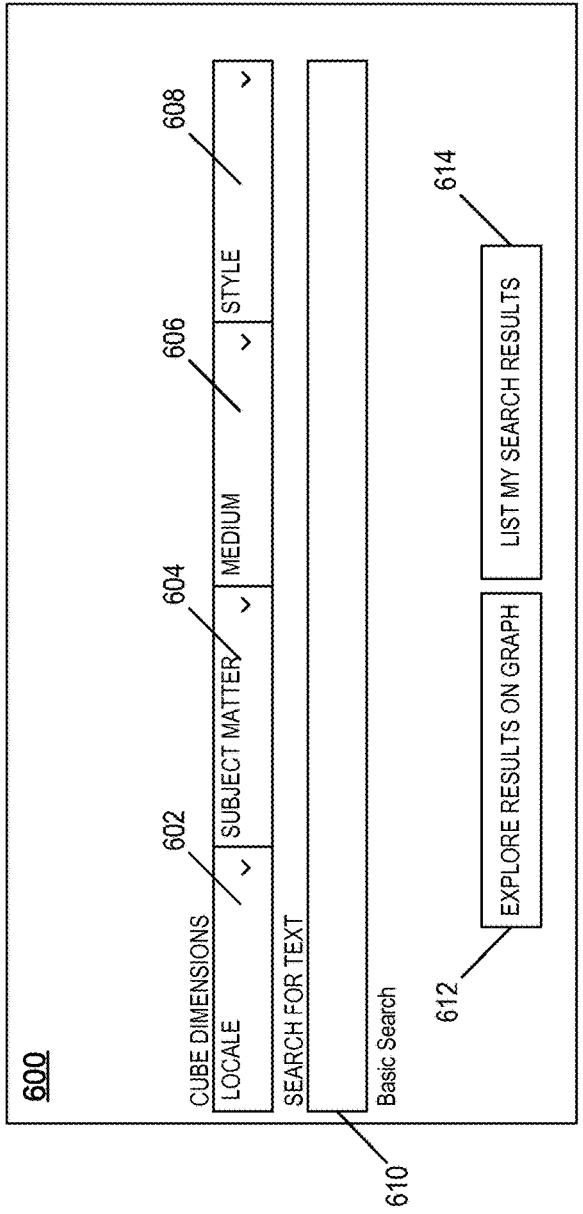
FIGS. 6A-6B are screenshots depicting an exemplary interface for selecting one or more tags to identify a document, consistent with embodiments of the present disclosure.
Figure 6B:
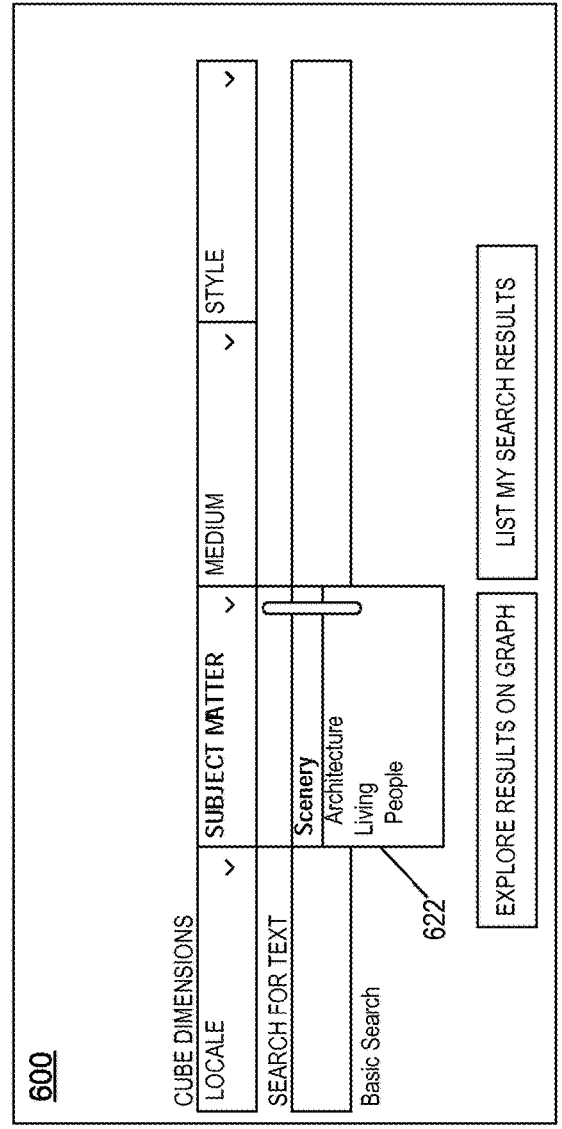

FIG. 6A and FIG. 6B are screenshots depicting an exemplary interface 600 for selecting one or more tags to identify a document, consistent with embodiments of the present disclosure. In some embodiments, the exemplary interface can be provided by an application. The application can be a web browser such as, for example, Google™ Chrome™, Mozilla™ Firefox™, Microsoft™ Internet Explorer™, etc.

In some embodiments, a bookmarklet is installed in the web browser. A bookmarklet can be a bookmark that is stored in a web browser and can contain JavaScript™ commands to extend the web browser's functionality. That is, a bookmarklet can be a simple "one-click" tool that can add functionality to the web browser. For example, a bookmarklet can modify the appearance of a web page within the web browser by changing the font size or the background color of the text, and/or extract data from a web page.

In some embodiments, a plug-in, instead of a bookmarklet, can be installed. A plug-in can be implemented as a set of software components that adds specific abilities to a larger software application, like a web browser, to enable customizing the functionality of the software application. For example, a plug-in can be installed in a web browser to enable the web browser to play video.

In some embodiments, the exemplary interface can be provided by a client-side application. All the exemplary interfaces discussed below can take in any form, such as being displayed as a pop-up window.

Referring back to FIG. 6A, interface 600 includes a locale field 602 for the locale dimension, a subject matter field 604 for the subject matter dimension, a medium field 606 for the medium dimension, and a style field 608 for the style dimension. Each of these fields can receive one or more tags as input to identify one or more relevant documents through interface 600, and can also display one or more tags as output through interface 600.

Fields 602, 604, 606, and 608 can receive input via any means. For example, interface 600 can allow a user to type in the tags or, in some embodiments as shown in FIG. 6B, further provides a pull-down menu 622 from which the user can choose one or more tags. In some embodiments, the field can also receive an incomplete text input, and then provide a list of suggested tags for the user to choose from. The list of suggested tags may include pre-defined tags that closely match the incomplete text input. In some embodiments, instead of providing a field for each dimension, interface 600 can provide a single field for tag selection for all dimensions, and the user can either type in a combination of tags into the single field, or select the tags from a pull-down menu provided by the single field.

In some embodiments, a search field 610 is also provided, allowing the user to search for documents based on text, rather than tags. After receiving the tags or the search text input, user interface 600 corresponds with object model 260 and/or database 270 to search for or identify the documents. In some embodiments, the user is provided an option to select, by clicking on button 612, to explore the result presented in a graphical map similar to chart 400 of FIG. 4A, where the graphical map can show one or more icons with links between them. In some embodiments, each icon in the graphical map represents a document and is selectable, and a selection of the icon can trigger a selection and a display of the document represented by the icon, while the link represents relationships between the tags associated with the documents represented by the icons.

In some embodiments, the user is provided an option to select, by clicking on button 614, to list the search result. The listing of search result will be discussed later.

Figure 7A:
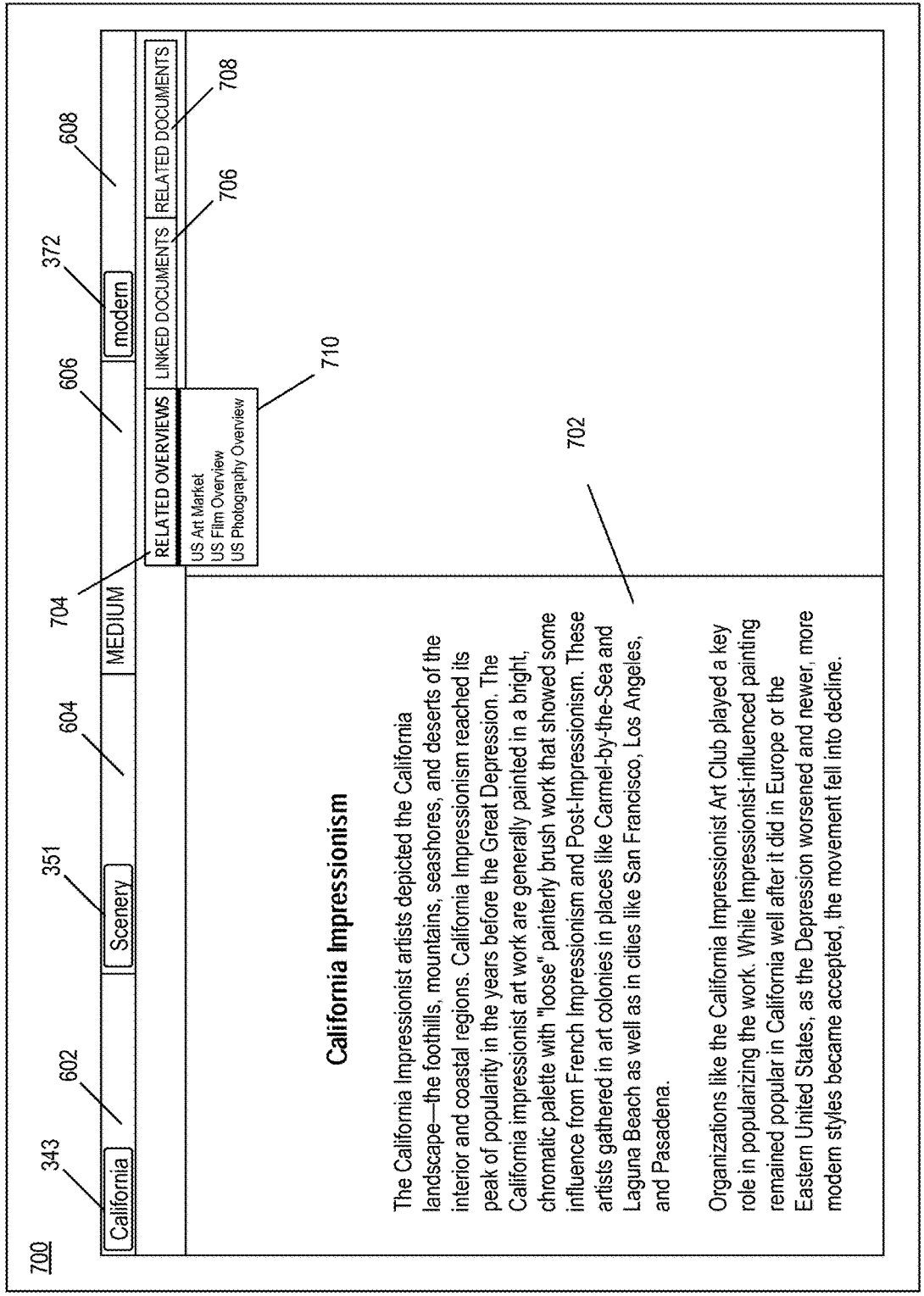
FIGS. 7A-7E are screenshots depicting exemplary interfaces for identifying and displaying documents based on tags, consistent with embodiments of the present disclosure.

FIG. 7A is a screenshot depicting an exemplary interface 700 for identifying and displaying documents based on tags, consistent with embodiments of the present disclosure. Based on one or more tags received in, for example, interface 600 of FIG. 6A, one or more documents (in this case, document 702) can be identified and displayed by virtue of the fact that, for example, document 702 is associated with a cell that is associated with the received tags.

Interface 700 may include fields 602, 604, 606, and 608 of interface 600 to display the tags received. In this exemplary illustration, California tag 343 is input under the locale dimension with field 602, scenery tag 351 is input under the subject matter dimension with field 604, and modern tag 372 is input under the style dimension with field 608, while no tag is input for the medium dimension. Document 702 titled "California Impressionism" can then be identified and displayed through interface 700 in response to the California tag, the scenery tag, and the modern tag input by virtue of, for example, document 702 being associated with a cell that is associated with these tags.

In some embodiments, interface 700 can also provide a means to access other documents related to document 702 or related to the tags selected. As shown in FIG. 7A, interface 700 provides a related-overview button 704, a linked-documents button 706, and a related-documents button 708.

Figure 7B:
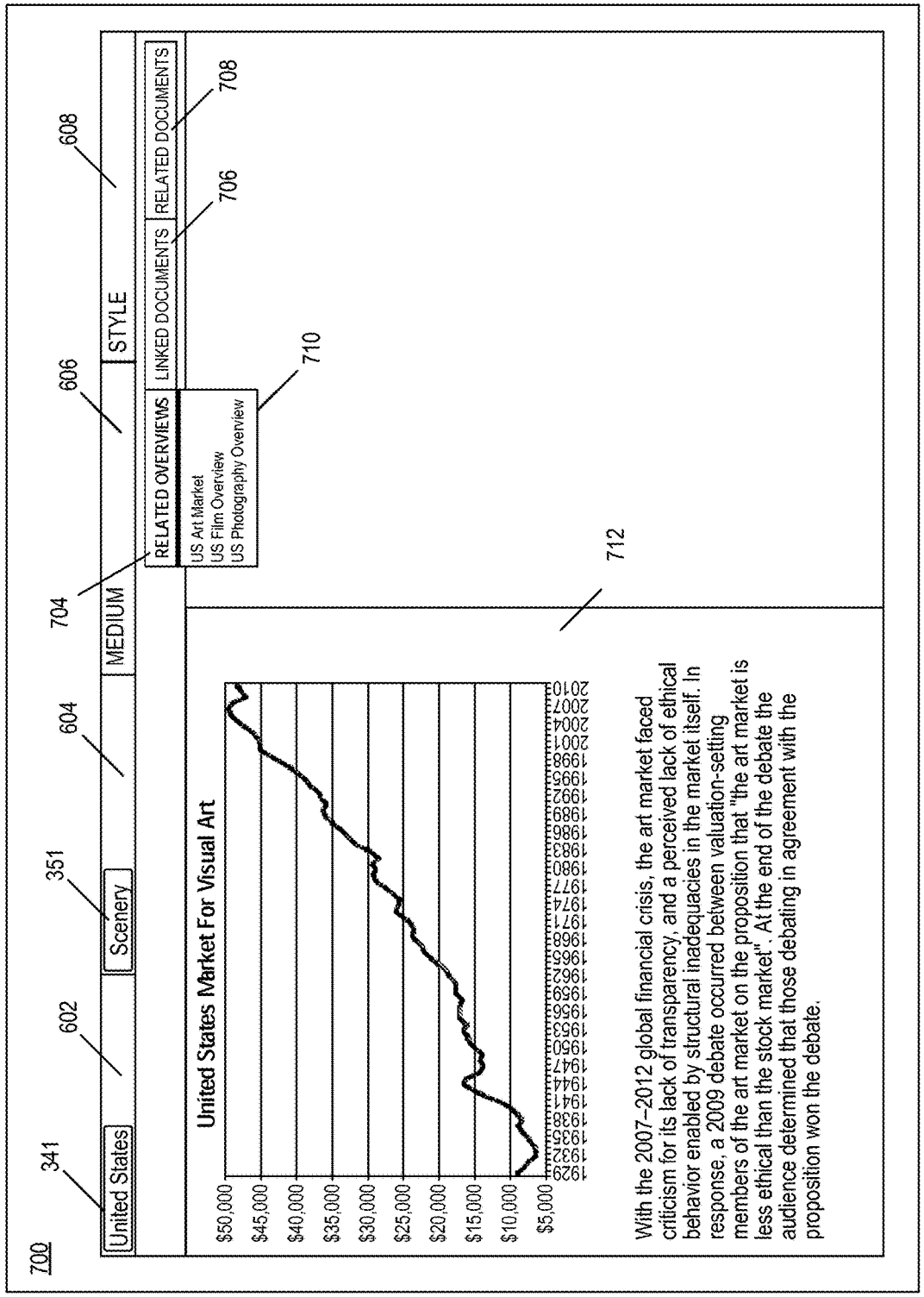

In an exemplary illustration, after clicking on the related-overviews button, a pull-down menu 710 can be displayed, which includes options including US art market, US film overview, and US photography overview. FIG. 7B is a screenshot depicting that a document 712 titled "United States Art Market" is identified and displayed when the "US Art Market option" of pull-down menu 710 is selected. As shown in FIG. 7B, document 712 is associated with United States tag 341, which is a hierarchical superset of California tag 343, and scenery tag 351. The related-overviews option can allow the user to identify documents that are relatively more closely related to document 702 of FIG. 7A. The closer relationship can be determined base on, for example, that document 712 is associated with a tag (United States tag 341) that is within the same dimension (locale dimension 340) as one of the tags associated with document 702 (California tag 343), or that a distance between documents 702 and 712 is below a certain threshold, as indicated by the fact that they are both associated with scenery tag 351.

Figure 7C:
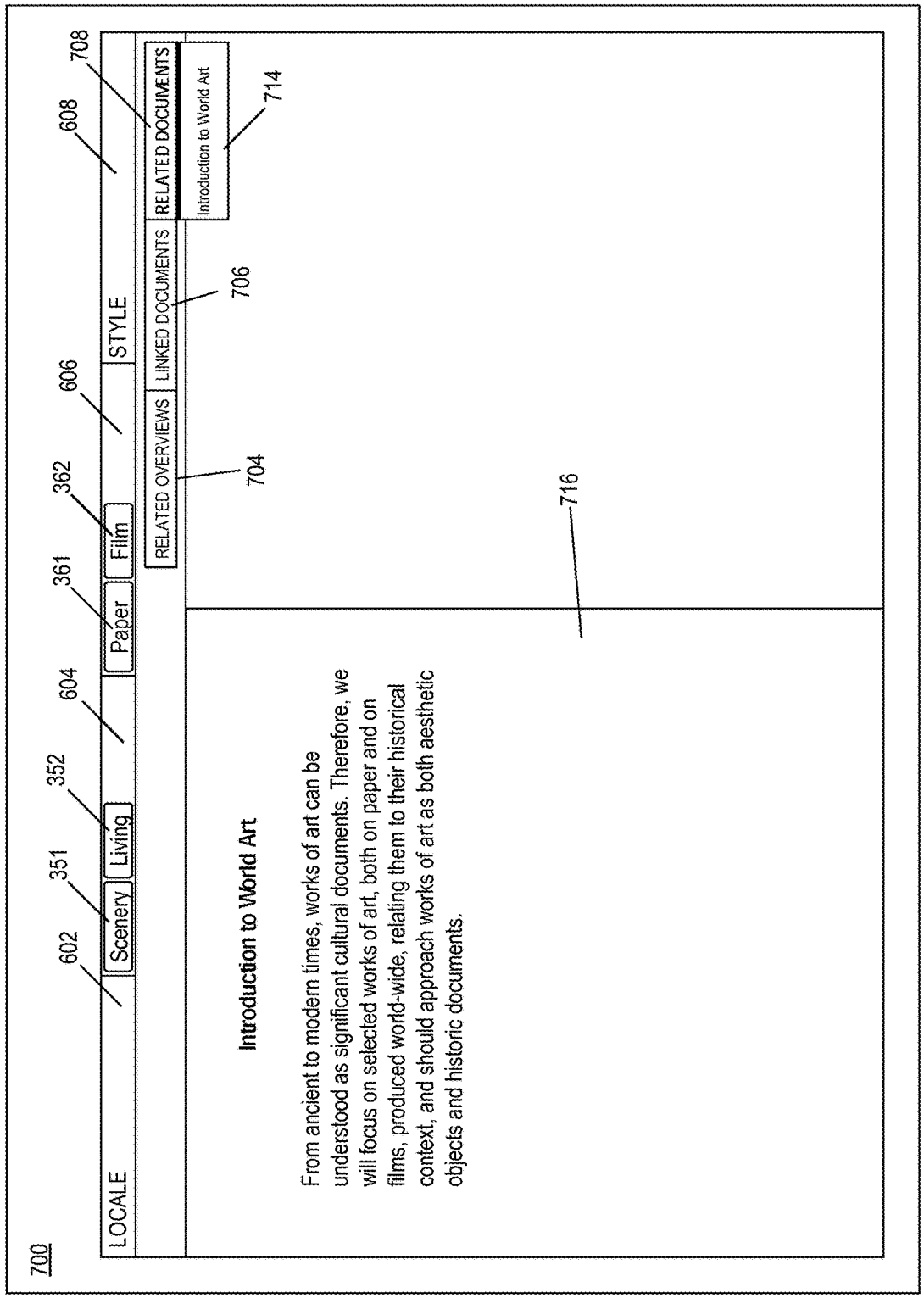

In another exemplary illustration, as shown in FIG. 7C, after clicking on the related-documents button 708, a pull-down menu 714 can be displayed, which includes an option "Introduction to World Art." In some embodiments, related-documents button 708 can also provide access to documents that are more broadly related to document 702 of FIG. 7A. For example, as shown in FIG. 7C, a document 716 titled "Introduction to World Art" is identified and displayed when the "Introduction to World Art" option of pull-down menu 714 is selected. As shown in FIG. 7C, document 716 is associated with scenery tag 351 and living tag 352 under the subject matter dimension, and is also associated with paper tag 361 and film tag 362 under the style dimension. Document 716 can be determined to be more broadly related to document 702 of FIG. 7A based on, for example, that while documents 716 and 702 are both associated with scenery tag 351 under the subject matter dimension, document 716 is associated with tags that are not associated with document 702 within the same dimension (e.g., living tag 352). The determination can also be based on that document 716 is associated with one or more tags of a specific dimension, while document 702 is not associated with any tag from that specific dimension (e.g., paper tag 361 and film tag 362 of the medium dimension). Therefore, related-documents button 708 allows a user to access documents across more dimensions and tags than related-overview button 704.

Figure 7D:
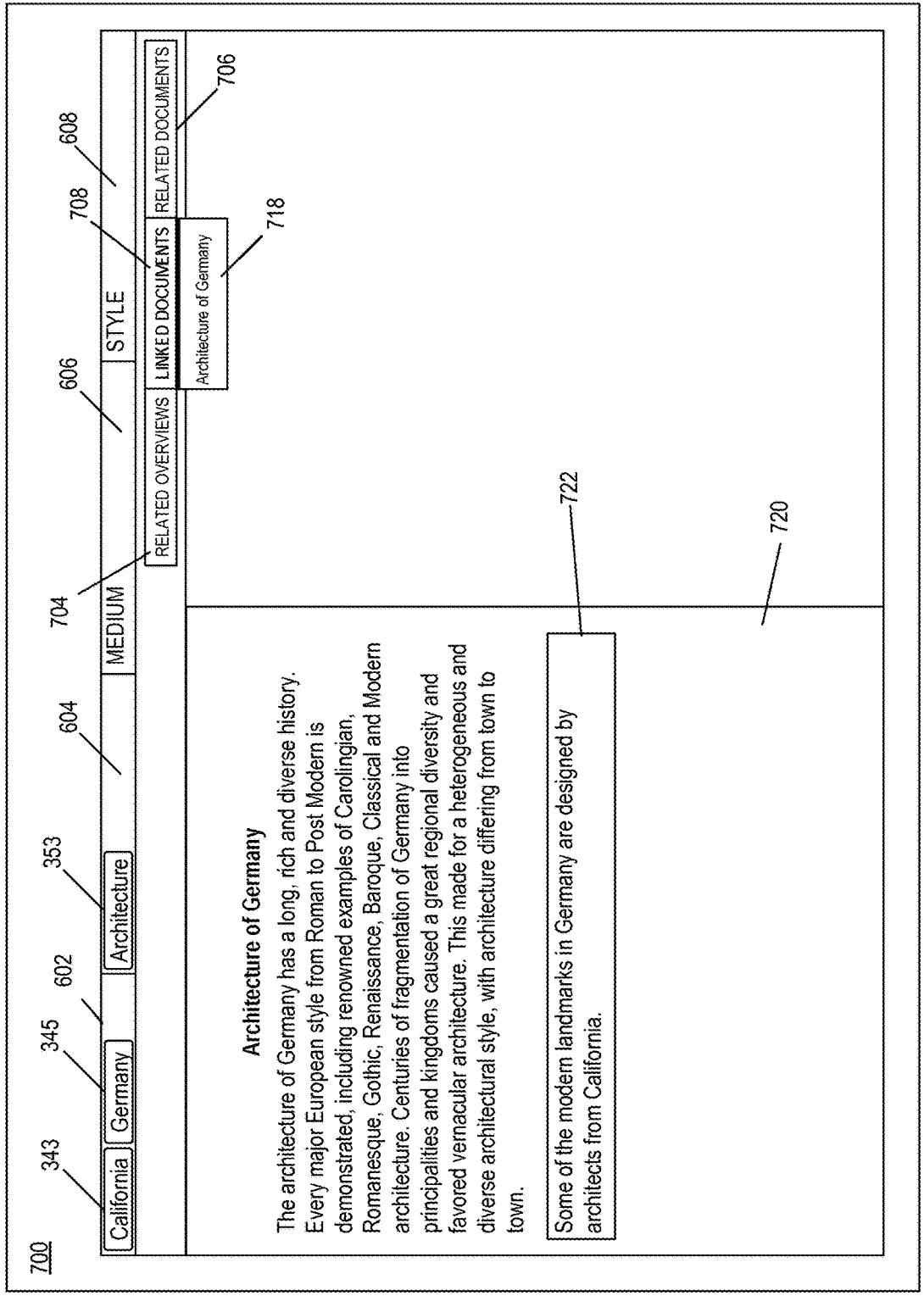

In another exemplary illustration, as shown in FIG. 7D, after clicking on the linked-documents button, a pull-down menu 718 can be displayed. In some embodiments, linked documents button 708 can provide access to documents associated with tags that have a lateral relationship with the tags selected. For example, referring to FIG. 3, the California tag 343 and the Germany tag 342 can be lateral to each other within tag hierarchy 310.

According to FIG. 7D, a document 720 titled "Architecture of Germany" is identified and displayed, when Architecture of Germany option of pull-down menu 718 is selected. As shown in FIG. 7D, document 720 is associated with Germany tag 342 and architecture tag 353. In this example, document 720 also has a California tag 343 because document 720 discusses about some of the landmarks in Germany are designed by architects from California, as shown in paragraph 722. The linked-documents option thus can also allow the user to identify documents associated with at least a tag (e.g. Germany tag 342) that has a lateral relationship with any one of the selected tags (e.g. California tag 343).

Figure 7E:
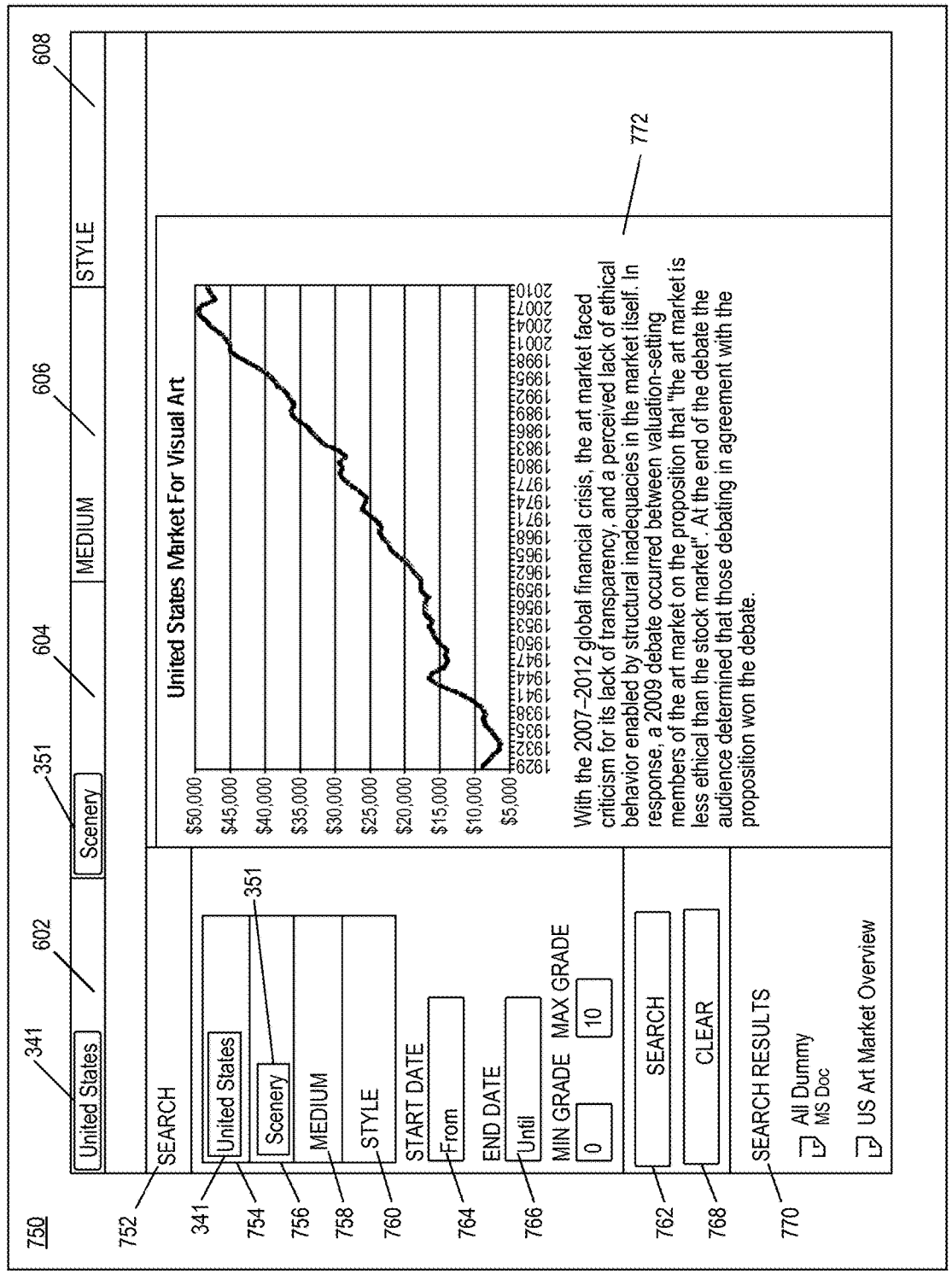

FIG. 7E is a screenshot depicting an exemplary interface 750 for identifying and displaying documents based on tags, consistent with embodiments of the present disclosure. Interface 750 includes a search interface 752 which can allow a search and display of one or more documents based on tags. In some embodiments, search interface 752 can be activated by, for example, clicking on button 614 of interface 600 as depicted in FIG. 6A to list the search result. In some embodiments, search interface 752 includes a locale field 754 for the locale dimension, a subject matter field 756 for the subject matter dimension, a medium field 758 for the medium dimension, and an style field 760 for the style dimension, which can allow the user to specify tags under each dimension for the search. In some embodiments, interface 750 may further include fields 602, 604, 606, and 608 of interface 600, and the fields 754, 756, 758, and 760 of the search interface 752 can be synchronized with, respectively, fields 602, 604, 606, and 608. In this exemplary illustration, United States tag 341 is input for the locale dimension, and scenery tag 351 is input for the subject matter dimension. Both fields 754 and 756 of search interface 752 can then display the same tags as, respectively, fields 602 and 604 of interface 750. A search for documents that are associated with a combination of tags input through fields 754, 756, 758, and 760 can then be performed, after clicking on the "search" button 762. The search interface 752 may also allow the user to provide additional search conditions, such as limiting to the search result to, for example, a start date and an end date provided through input fields 764 and 766. The user can clear the search conditions (e.g. tags and start/end date) by clicking on the "clear" button 768. After the search is performed, search result 770 is displayed. In this exemplary embodiment, search result 770 displays metadata such as the file type and the title of the documents found. The user can also select a document from the search result 770, which can lead to the displaying of document 772.

Figure 8A:
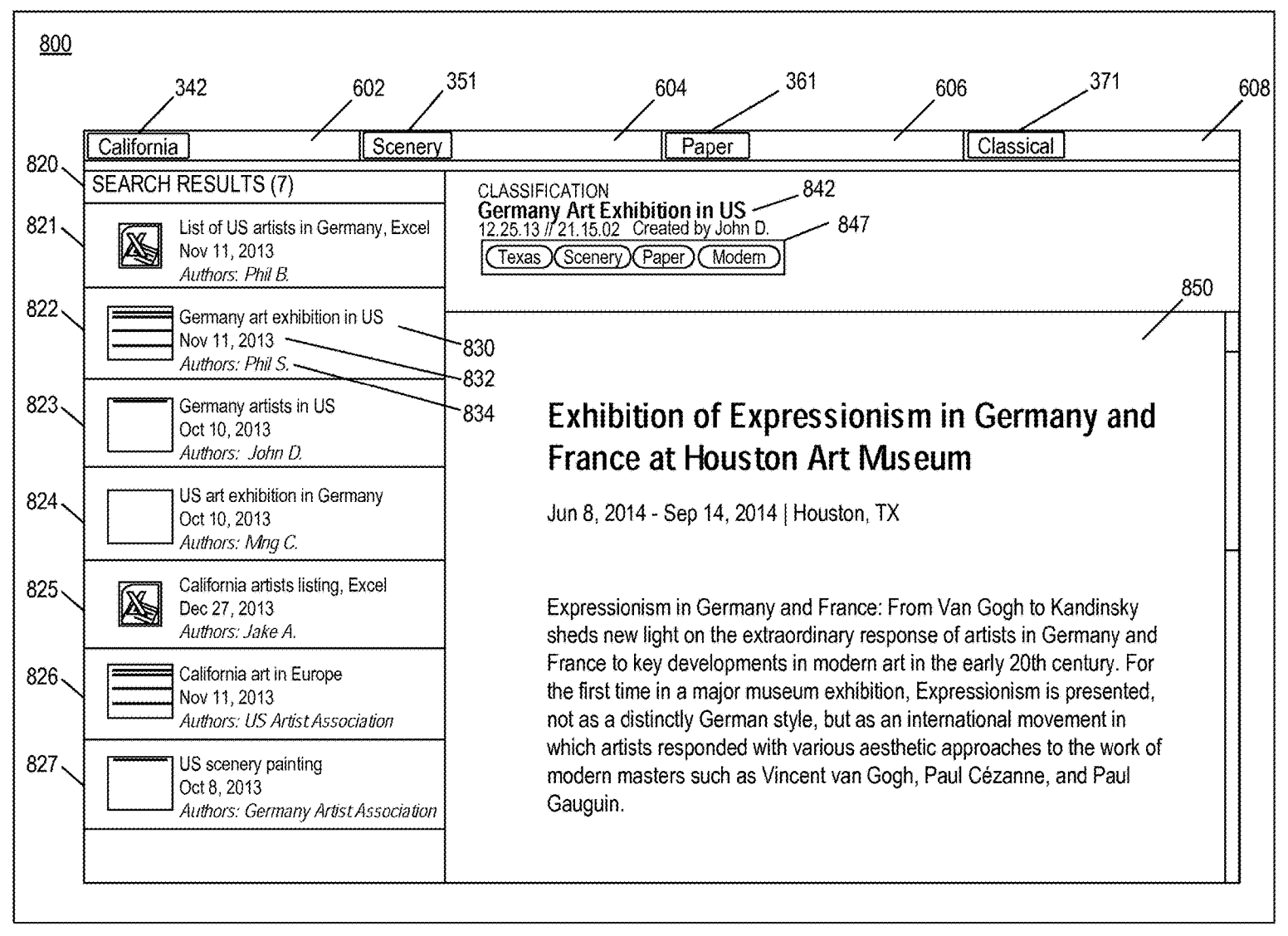

FIG. 8A is a screenshot depicting an exemplary interface 800 for identifying and displaying documents based on tags from previously identified documents, consistent with embodiments of the present disclosure. Interface 800 includes fields 602-608 of interface 600. In this example, United States tag 341 is input for the locale dimension with field 602, scenery tag 351 is input for the subject matter dimension with field 604, paper tag 361 is input for the medium dimension with field 606, and classical tag 371 is input for the style dimension with field 608. Thus, in this illustration, a tag combination identical to tag combination 532 of FIG. 5 is input for the search. Interface 800 also includes a search results interface 820, which displays search results 821-827. Search results 821-827 can show a list of, for example, documents that are found based on the selected tags, with metadata for each document, such as title 830, date 832, and author 834. Each of the documents in the search results can be selected, with additional information of the selected document displayed, such as classification 842, and tag combination 847.

In this exemplary illustration, a document titled "Exhibition of Expressionism in Germany and France at Houston Art Museum" is chosen, and is displayed as document 850. Selected document 850 is tagged with, for example, tag combination 847, which is identical to tag combination 552 of FIG. 5, and which includes Texas tag 344, scenery tag 351, paper tag 361, and modern tag 372. Referring to FIG. 5, selected document 850 can be associated with cell 550, by virtue of having tag combination 847 which is identical to tag combination 552, and cell 550 has relationship 545 with cell 530 that is associated with tag combination 532 which is identical to the tag combination input for this search. In some embodiments, interface 800 may also allow the user to add or modify the tags associated with the chosen document. For example, the user can remove classical tag 371 from the document, or tag the document with other tags under the style dimension.

Figure 8B:
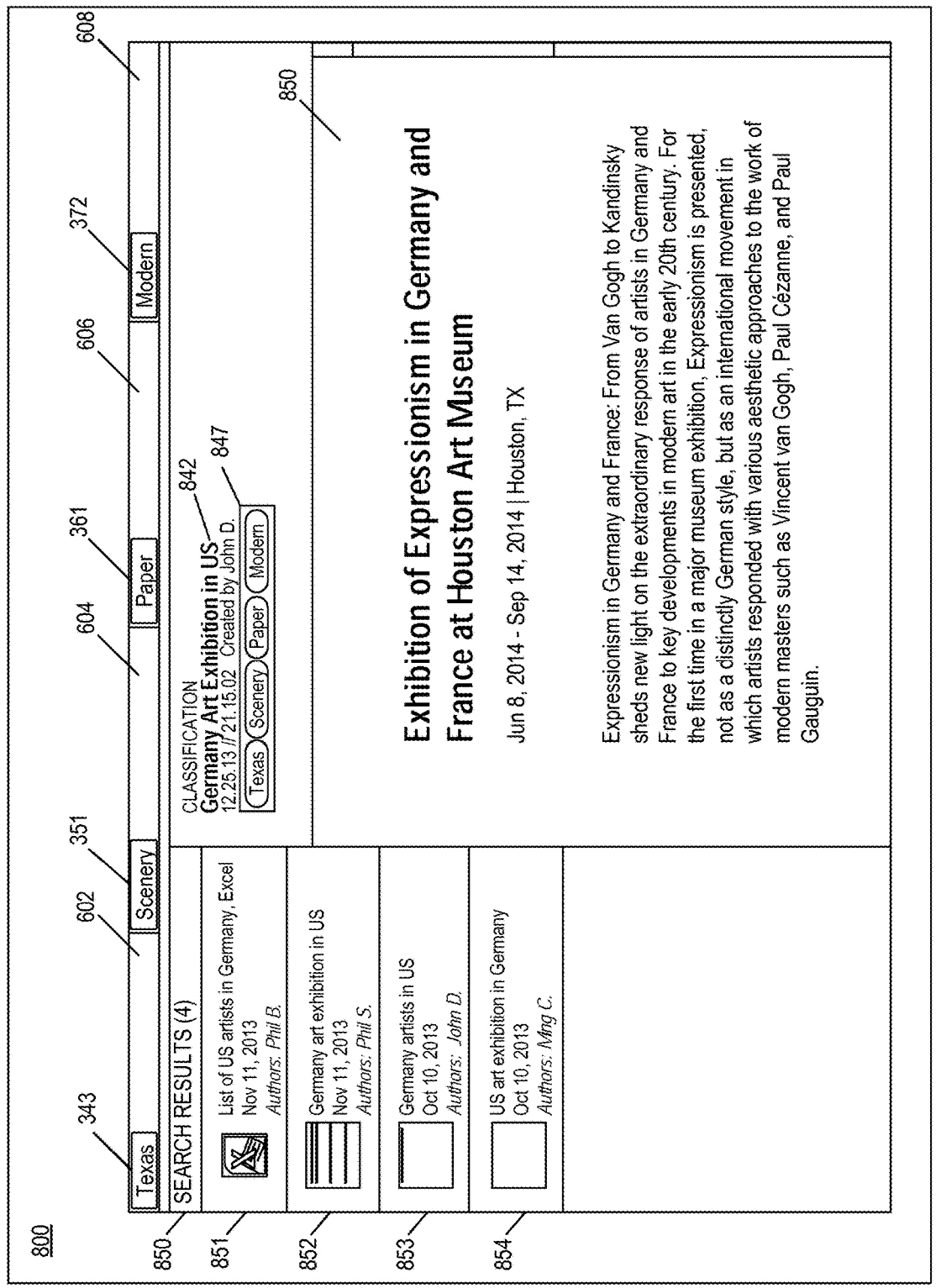

FIG. 8B is another screenshot depicting exemplary interface 800. After the selection of document 850, which is tagged with tag combination 847 (which is identical to tag combination 552), fields 602-608 can be populated with the tags of tag combination 847. In this exemplary illustration, the locale dimension, which has California tag 343 when the prior search is performed, can be populated with Texas tag 344 from selected document 850. Moreover, the style dimension, which has classical tag 371 when the prior search is performed, can be populated with modern tag 372, also from selected document 850. The user can then perform a new search, and an updated search results 850 is shown, which includes search results 851-854. Referring to FIG. 5, some of the documents in search result 850 may be associated with a cell that is related to cell 550 associated with tag combination 552 (which is identical to tag combination 847), such as cell 590, cell 510, and cell 530, etc. This can allow the user to begin with an initial group of tags to identify one or more documents related to the initial set of tags, and then receive additional or new sets of tags from the identified documents. The additional or new sets of tags can then be used to refine the user's exploration in the universe of documents stored in data sources 230, and the refinement can be guided by the predefined relationship between the tags, which can determine the set of related documents provided for a given set of tags.

Figure 9:
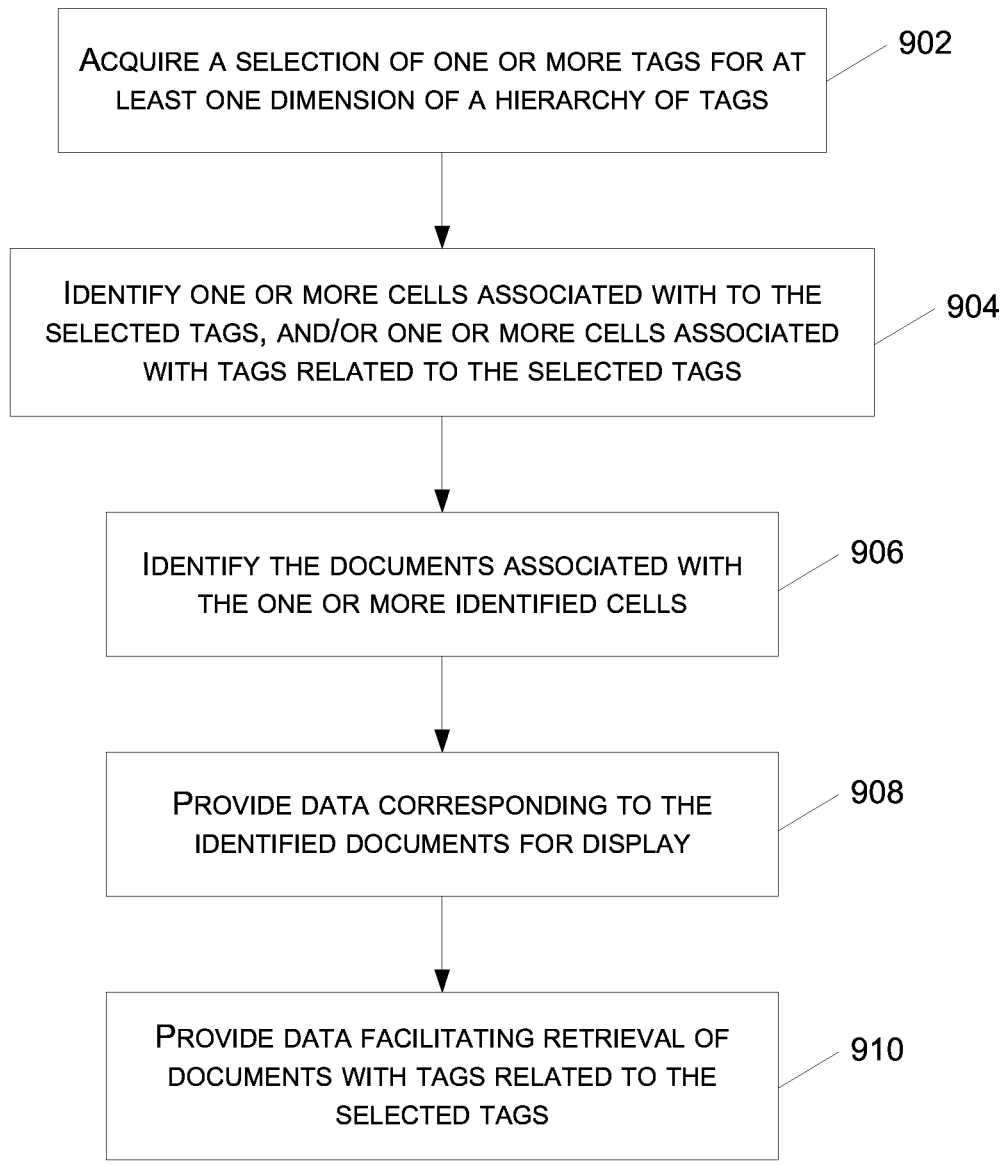
FIG. 9 is a flowchart representing an exemplary method performed by an electronic device for identifying documents based on tags, consistent with embodiments of the present disclosure.

FIG. 9 is a flowchart representing an exemplary method 900 performed by an electronic device for identifying documents based on selected tags, consistent with embodiments of the present disclosure. The selected tags can be part of a predefined tag hierarchy (e.g., tag hierarchy 310 of FIG. 3).

In this exemplary illustration, the electronic device (e.g., a computer system 100) can interact with one or more other devices and/or storage components (e.g., data sources 230, object model 260, and database 270 of system 200 depicted in FIG. 2) for assisting with the identification of documents. While the flowchart discloses the following steps in a particular order, it will be appreciated that at least some of the steps can be moved, modified, or deleted where appropriate, consistent with the teachings of the present disclosure. And while the following steps are indicated as being performed by an electronic device, it is appreciated that the steps can be performed by more than one electronic device.

In step 902, the electronic device acquires a selection of one or more tags for at least one dimension defined under the tag hierarchy. The selection can be provided by a web-browser, or by a client-side application, after receiving the selection from a user.

In step 904, after acquiring the tag selection, the electronic device identifies one or more cells that are associated with the selected tags, and/or one or more cells associated with tags related to the selected tags. As indicated above, these identified cells can be provided by an object model (e.g., object model 260). In some embodiments, the relationship can be determined based on the attributes of the tags. For example, if a cell has attributes that match the selected tags, that cell can be identified.

In some embodiments, a combination of tags of one or more dimensions within tag hierarchy 310 can be represented as a multi-dimensional vector, with each dimension of tag hierarchy 310 represented by a vector dimension, and a combination of one or more tags under a dimension of tag hierarchy 310 contributes to a magnitude of the vector along that vector dimension, based on the attributes of the tags. The relationship between tags can then be calculated as, for example, an imaginary distance between the multi-dimensional vectors representing the tag combinations. In some embodiments, such imaginary distance can be calculated by first projecting the multi-dimensional vectors representing the tag combinations onto a pre-defined plane, and then calculating a distance between the projections on the pre-defined plane. In some embodiments, when the calculated distance exceeds a certain threshold, it can be determined that no relationship exists between the tag combinations. In some embodiments, the relationship between cells (or between tag combinations associated with the cells) can also be added manually with or without considering the calculated distance.

In step 906, the electronic device identifies documents associated with the one or more identified cells. As indicated above, tagged documents are associated with cells.

In step 908, the electronic device provides data corresponding to the identified documents for display. The identified documents can be represented as a list similar to search results 820 depicted in FIG. 8A, or similar to a graphical representation as depicted in FIG. 4A.

In step 910, the electronic device further provides data facilitating retrieval of documents with tags related to the selected tags. The data can be provided and displayed after, for example, the electronic device detects the clicking of at least one of related overview button 704, a linked documents button 706, and a related documents button 708 of interface 700. The data facilitating retrieval of documents can be displayed in the same interface as the data for the identified documents. For example, interface 700 can further include a pop-up window that includes requested information.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. An apparatus comprising:
a memory device that stores a set of instructions; and
at least one processor configured to execute the set of instructions to:
communicate with one or more data storage devices configured to store an object model comprising cells, wherein relationships among the cells are based at least in part on relationships among tag values of tags associated with the cells;
receive search criteria including indications of one or more tag values; and
in response to receiving the search criteria:
determine a first cell of the object model matching the one or more tag values indicated in the search criteria;
determine a second cell of the object model that is related to the first cell based on the object model; and
provide, for display in a user interface, indications of one or more data items associated with the second cell.

2. The apparatus of claim 1, wherein the at least one processor is further configured to execute the set of instructions to:
determine that the second cell is related to the first cell by at least:
determine a first tag common to both the first cell and the second cell, wherein respective first and second tag values of the first tag associated with the respective first and second cells are different; and
determine a relationship between the respective first and second tag values of the first tag associated with the respective first and second cells.

3. The apparatus of claim 2, wherein the first tag value has a hierarchical relationship with the second tag value, in which the second tag value is a subset of the first tag value, or the first tag value is a subset of the second tag value, and wherein identification of at least one or more data items associated with the second cell is based at least in part on the hierarchical relationship.

4. The apparatus of claim 1, wherein the at least one processor is further configured to execute the set of instructions to:
receive, via the user interface, a selection of a data item from the one or more data items associated with the second cell; and
responsive to the selection of the data item, update the search criteria to include indications of one or more tag values associated with the data item.

5. The apparatus of claim 1, wherein the tags associated with the cells include multiple dimensions, and wherein the user interface provides an input selection field for each dimension or a single input selection field that can receive a combination of dimensions of tags.

6. The apparatus of claim 5, wherein the user interface provides a drop down menu to display one or more tags or tag values for selection.

7. The apparatus of claim 1, wherein the user interface displays a list of selectable items representing the one or more data items associated with the second cell, wherein each selectable item corresponds to an identified data item and includes a title and metadata for the data item, and wherein a selection of one of the selectable items causes the data item corresponding to the selected selectable item to be selected.

8. The apparatus of claim 1, wherein the at least one processor is further configured to execute the set of instructions to:
receive, via the user interface, an input of one or more tag values, while displaying a data item; and
update one or more tag values associated with the data item based on the input of the one or more tags values.

9. The apparatus of claim 1, wherein the at least one processor is further configured to execute the set of instructions to:
determine the relationships among the cells in the object model by at least:
representing each cell as a respective multi-dimensional vector based on the combination of tag values associated with the respective cells; and
determining an imaginary distance between the multi-dimensional vectors associated with each pair of cells of the plurality of cells; and
for each pair of cells:
comparing the imaginary distance between the multi-dimensional vectors associated with the pair of cells to a threshold; and
in response to the imaginary distance satisfying the threshold, determining that a relationship exists between the pair of cells.

10. The apparatus of claim 1, wherein the at least one processor is further configured to execute the set of instructions to:
determine that the second cell is related to the first cell by at least:
determining that a first tag associated with the first cell and a second tag associated with the second cell have a common associated tag dimension in a tag hierarchy based on tag values of the respective first and second tags, wherein the identification of at least one or more data items associated with the second cell is based on both cells having the common tag dimension.

11. A computer-implemented method comprising:
communicating with one or more data storage devices configured to store an object model comprising cells, wherein relationships among the cells are based at least in part on relationships among tag values of tags associated with the cells;
receiving search criteria including indications of one or more tag values; and
in response to receiving the search criteria:
determining a first cell of the object model matching the one or more tag values indicated in the search criteria;
determining a second cell of the object model that is related to the first cell based on the object model; and
providing, for display in a user interface, indications of one or more data items associated with the second cell.

12. The method of claim 11 further comprising:
determining that the second cell is related to the first cell by at least:
determining a first tag common to both the first cell and the second cell, wherein respective first and second tag values of the first tag associated with the respective first and second cells are different; and
determining a relationship between the respective first and second tag values of the first tag associated with the respective first and second cells.

13. The method of claim 12, wherein the first tag value has a hierarchical relationship with the second tag value, in which the second tag value is a subset of the first tag value, or the first tag value is a subset of the second tag value, and wherein identification of at least one or more data items associated with the second cell is based at least in part on the hierarchical relationship.

14. The method of claim 11 further comprising:
receiving, via the user interface, a selection of a data item from the one or more data items associated with the second cell; and
responsive to the selection of the data item, updating the search criteria to include indications of one or more tag values associated with the data item.

15. The method of claim 11, wherein the tags associated with the cells include multiple dimensions, and wherein the user interface provides an input selection field for each dimension or a single input selection field that can receive a combination of dimensions of tags.

16. The method of claim 15, wherein the user interface provides a drop down menu to display one or more tags or tag values for selection.

17. The method of claim 11, wherein the user interface displays a list of selectable items representing the one or more data items associated with the second cell, wherein each selectable item corresponds to an identified data item and includes a title and metadata for the data item, and wherein a selection of one of the selectable items causes the data item corresponding to the selected selectable item to be selected.

18. The method of claim 11 further comprising:
receiving, via the user interface, an input of one or more tag values, while displaying a data item; and
updating one or more tag values associated with the data item based on the input of the one or more tag values.

19. The method of claim 11 further comprising:
determining the relationships among the cells in the object model by at least:
representing each cell as a respective multi-dimensional vector based on the combination of tag values associated with the respective cells; and
determining an imaginary distance between the multi-dimensional vectors associated with each pair of cells of the plurality of cells; and
for each pair of cells:
comparing the imaginary distance between the multi-dimensional vectors associated with the pair of cells to a threshold; and
in response to the imaginary distance satisfying the threshold, determining that a relationship exists between the pair of cells.

20. The method of claim 11 further comprising:
determining that the second cell is related to the first cell by at least:
determining that a first tag associated with the first cell and a second tag associated with the second cell have a common associated tag dimension in a tag hierarchy based on tag values of the respective first and second tags, wherein the identification of at least one or more data items associated with the second cell is based on both cells having the common tag dimension.

* * * * *